(12) United States Patent
Hotta et al.

(10) Patent No.: US 6,236,797 B1
(45) Date of Patent: May 22, 2001

(54) LIGHT TRANSMITTING TUBE

(75) Inventors: Atsushi Hotta; Tatsuo Terahama, both of Tokyo; Itsuo Tanuma, Sayama, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/433,744

(22) Filed: Nov. 4, 1999

(30) Foreign Application Priority Data

Nov. 5, 1998 (JP) .................................................. 10-314708
Nov. 5, 1998 (JP) .................................................. 10-314709

(51) Int. Cl.⁷ ........................................................... G02B 6/00
(52) U.S. Cl. ............................ 385/143; 385/123; 385/125
(58) Field of Search ................................... 385/143, 125, 385/100, 114, 116, 123, 142

(56) References Cited

U.S. PATENT DOCUMENTS 5,982,969 * 11/1999 Sugiyama et al. .................. 385/123

* cited by examiner

*Primary Examiner*—Phan T. H. Palmer
(74) *Attorney, Agent, or Firm*—Kanesaka & Takeuchi

(57) ABSTRACT

A light transmitting tube 1, which can significantly reduce the loss of light at a bent portion, comprises a tubular cladding 3 and a solid core 2 made of material having reflection index higher than that of the material for the tubular cladding 3. The cladding 3 has rigidity higher than the core 2. The core 2 and the cladding 3 are not bonded to each other. As the light transmitting tube 1 is bent, an air layer 4 is appears between the core 2 and the cladding 3.

14 Claims, 1 Drawing Sheet

LIGHT TRANSMITTING TUBE

BACKGROUND OF THE INVENTION AND RELATED ART STATEMENT

The present invention relates to a light transmitting tube to be employed for illuminations, projectors, and the like and, more particularly, to light transmitting tube to be suitably employed in case that the tube is used in an environment where the tube is bent to have a small radius or is bent at many portions, or in case that a flexible tube surrounding an optical transmission tube has a small inner diameter.

A neon tube and a fluorescent tube have been used as a light emitting member for providing light in length of several meters. However, the neon tube and the fluorescent tube require high voltage. The neon tube or the fluorescent tube can not be used in water or at a place to be wet with rain or snow because dangers including electric shock and electrical leakage may occur. Furthermore, since the neon tube and the fluorescent tube are made of glass tube, these have drawback in their impact resistance, so the neon tube and the fluorescent tube can not be used at such a place that an object including a person or a vehicle may come in contact with the tube.

Another conventional light transmitting tube is formed by filling a transparent core liquid or flexible transparent polymer into a flexible tube. A further another light transmitting tube is prepared by twisting plastic optical fibers. Light generated from a light source is entered into each of the tubes through an end of the tube and emitted out of the surface of the tube over a length of dozens of meters so that the light source and the emitting portion are separately provided, thus reducing the danger of damage. Therefore, the light transmitting tube can be used in water, outdoors, or an environment having a possibility of explosion. In addition, since complex process including glass blowing is not required, the light transmitting tube can be easily manufactured and can provide good workability.

Conventionally, in the light transmitting tube having a liquid core, when bent as shown in FIG. 3, many light beams have angles of incidence relative to the outer surface of the tube, which are smaller than the critical angle, at the bent portion, thus increasing the optical leakage (optical loss) out of the core. This has been a problem. Therefore, materials have been selected to increase the difference between the respective reflective indexes and many structural designs have been made to reduce the optical loss at the bent portion as much as possible. However, it is difficult to select such materials because of requirement of transparency and it is also difficult to design structure for each of applications.

OBJECT AND SUMMARY OF THE INVENTION

It is an object of the present invention to solve the above conventional problems and to provide a light transmitting tube which can reduce the optical loss at a bent portion and which allows the increase in the included angle of incident beams into the light transmitting tube without increasing the optical loss.

A light transmitting tube of a first aspect comprises a tubular cladding and a solid core made of material having reflection index higher than that of the material for the tubular cladding, wherein the cladding has rigidity higher than said core, and the core and said cladding are not bonded to each other.

It is preferable that the cladding is a thermoplastic tube and the core is flexible solid matter.

The light transmitting tube of the first aspect comprises the cladding and the transparent solid core having reflection index higher than that of the cladding. In this light transmitting tube, the cladding is made to have rigidity higher than that of the core, and the core and the cladding are not bonded to each other whereby the core and the cladding are separated from each other so as to appear a space (air layer) between the outer surface of the core and the inner surface of the cladding at a bent portion of the light transmitting tube. Since the difference in the reflection index between the core and the air layer is larger than the difference in the reflection index between the core and the cladding, the critical angle is reduced, thereby reducing the optical loss at the bent portion.

It should be noted that the term "not bonded" means a state that the cladding and the core do not adhere to each other such that the cladding and the core can be separated from each other at the interface therebetween.

An optical transmission tube according to a second aspect comprises tubular cladding made of thermoplastic material and a solid core made of material having reflection index higher than that of the material for the tubular cladding, wherein said cladding is expanded by heating whereby an air layer is produced between said core and said cladding.

It is preferable that the core is made of thermosetting material.

The light transmitting tube of the second aspect comprises the cladding made of thermoplastic material and the transparent solid core having reflection index higher than that of the cladding. In this light transmitting tube, said cladding is expanded by heating whereby the core and the cladding are separated so as to produce a space (air layer) between the outer surface of the core and the inner surface of the cladding. Since the difference in the reflection index between the core and the air layer is larger than the difference in the reflection index between the core and the cladding, the critical angle is reduced, thereby reducing the optical loss at the portion where the air layer is produced. This means the optical loss can be reduced at a bent portion of the light transmitting tube. The included angle of the incident beams into the light transmitting tube can be increased without increasing the optical loss.

DETAILED DESCRIPTION OF PREFERRED EMBODIMENTS

Hereinafter, embodiments of the present invention will be described with reference to the attached drawings.

Figure 1:
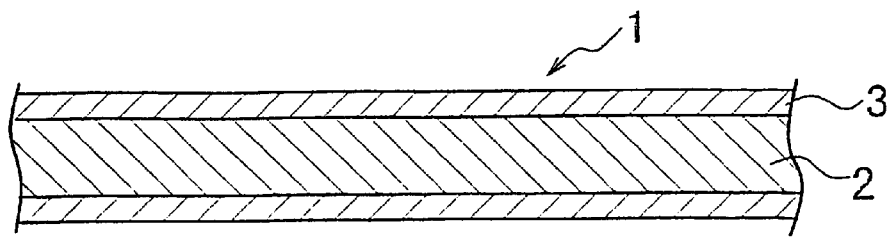
FIG. 1 is a sectional view of a light transmitting tube according to an embodiment.
Figure 2:
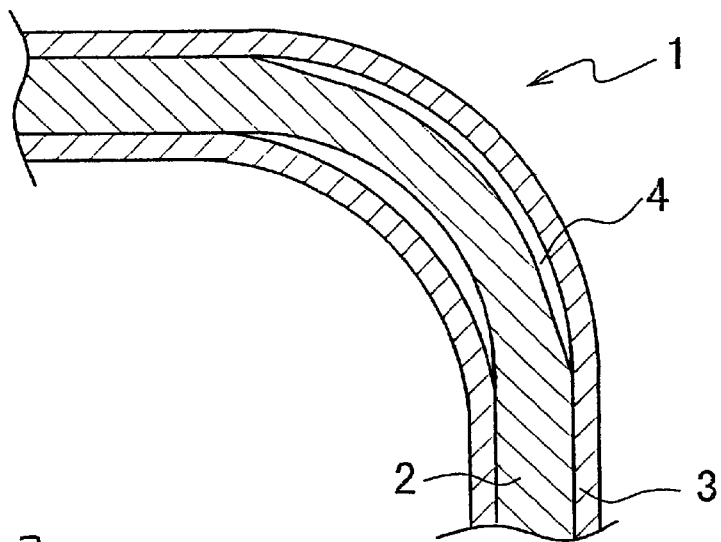
FIG. 2 is a sectional view showing a state where the light transmitting tube according to the embodiment is bent.
Figure 3:
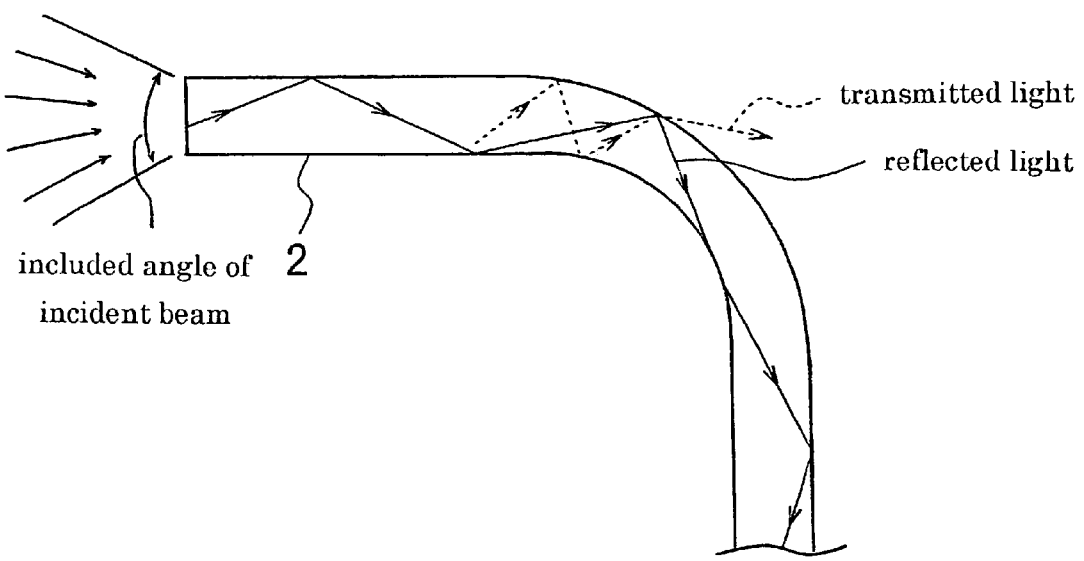
FIG. 3 is a view showing paths of light within a bent core.

FIG. 1 is a sectional view showing an embodiment of a light transmitting tube of a first aspect, FIG. 2 is a sectional view of a bent portion, and FIG. 3 is a view for explaining light paths within a core.

A light transmitting tube 1 shown in FIGS. 1 through 3 comprises a core 2 and a tubular cladding 3 covering the core 2. The material (core material) for the core 2 is a transparent material, of course, having reflection index higher than that of the material (cladding material) for the tubular cladding 3. The core material used in this aspect has rigidity lower than the cladding material. Suitably employed as the core 2 is a flexible solid matter which is selected from a group including plastic, elastomer, and the like.

Concrete examples of the core material include transparent materials including polystyrene, styrene-methyl methacrylate copolymer, (meth)acrylic resin, polymethyl pentene, allyl glycol carbonate resin, spiran resin, amorphous polyolefin, polycarbonate, polyamide, polyallylate, polysulfone, polyallyl sulfone, polyether sulfone, polyether imide, polyimide, diallyl phthalate, fluoroplastic, polyester carbonate, resin of norbornane family, alicyclic acrylic resin, silicone resin, acrylic rubber, and silicone rubber. The term "(meth) acrylic" means "acrylic and methacrylic".

The cladding material can be selected from a group of transparent materials having low reflection index, including organic materials having high elasticity including plastic and elastomer. As mentioned above, the cladding material has rigidity higher than the core material.

Concrete examples as the cladding material include polyethylene, polypropylene, polymethyl methacrylate, polymethyl methacrylate fluoride, polyvinyl chloride, polyvinylidene chloride, polyvinyl acetate, polyethylene-vinyl acetate copolymer, polyvinyl alcohol, polyethylene-polyvinyl alcohol copolymer, fluoroplastic, silicone resin, natural rubber, polyisoprene rubber, polybutadiene rubber, styrene-butadiene copolymer, butyl rubber, halogenated butyl rubber, chloroprene rubber, acrylic rubber, ethylene-propylene-diene terpolymer (EPDM), acrylonitrile-butadiene copolymer, fluororubber, and silicone rubber.

Among the aforementioned examples of the core material and the cladding material, polystyrene, polycarbonate, styrene-(meth)acrylate copolymer (MS polymer) are preferable for the core material because of their optical characteristics, including transparency and reflection index, and their workability for simultaneous extrusion. Polymers of (meth)acrylic family are preferable for the cladding material.

The diameter of the core 2 is normally in a range between 2 mm and 30 mm, particularly, in a range between 5 mm and 15 mm, but not limited thereto. The thickness of the tubular cladding 3 is normally in a range between 0.05 mm and 4 mm, particularly, in a range between 0.2 mm and 2 mm.

In the first aspect, the outer surface of the core 2 is not bonded to the inner surface of the cladding 3. When the light transmitting tube 1 is bent, a space (air layer) 4 is formed between the outer surface of the core 2 and the inner surface of the cladding 3 as shown in FIG. 2.

The light transmitting tube in which the core 2 and the cladding 3 are not bonded to each other is manufactured by, for example, extruding the core material to form the core, applying a mold releasing agent including silicone having high transparency, if necessary, on the outer surface of the core and, then, extruding the cladding material into a tubular shape around the core to form the cladding. As the difference in elasticity modulus between the cladding and the core increases, the efficiency of non-bonding is increased, thereby facilitating the separation between the outer surface of the core and the inner surface of cladding when the optical transmission tube is bent.

As the light transmitting tube 1 is bent, an air layer 4 is appeared at the bent portion as shown in FIG. 2. Since the reflection index of air is smaller than that of the cladding 3, the difference in the reflection index between the core 2 and the air layer 4 is larger than the difference in the reflection index between the core 2 and the cladding 3. As a result of this, the critical angle of incident beam (the angle of incidence at which the light can be entirely reflected) relative to the outer surface of the core adjacent to the air layer 4 should be small so that the loss of the light, i.e. beams passing through the outer surface of the core, at the bent portion can be reduced. This prevents exorbitant loss of the light at the bent portion (particularly, at the outer side of the curvature).

The first aspect will be described concretely by using examples and comparative examples.

EXAMPLE 1

A light transmitting tube was made by thermal polymerization, in which the core material was soft silicone rubber and the cladding material was high-rigid fluoroplastic. The diameter of the core was 9 mm. The thickness of the cladding was 1 mm. The surfaces of the core and the cladding were not bonded to each other. The hardness of the core was 40° and the hardness of the cladding was 90°.

The rate of amount of light (light retention) between the incident beams and the outgoing beams was measured under conditions that the light transmitting tube was bent by 90° to have a radius of curvature R=40 mm and that a halogen lamp of 100 W was used as the light source. The light retention as a result of the measurement was 90%. An air layer having maximum thickness of 0.5 mm appeared at the bent portion.

COMPARATIVE EXAMPLE 1

A light transmitting tube was made in the same manner as Example 1 except for using soft fluororubber having hardness of 60° as the cladding material. The light retention was measured under the same condition that the tube was bent by 90° to have R=40 mm. The light retention as a result of the measurement was 81%. No air layer was appeared at the bent portion.

EXAMPLE 2

A light transmitting tube was made in the same manner as Example 1 except for the diameter of the core being 7 mm. The light retention was measured under the same condition as Example 1 except for using a metal halide lamp of 35 W as the light source. The light retention as a result of the measurement was 93%. An air layer having the maximum thickness of 0.5 mm appeared at the bent portion.

COMPARATIVE EXAMPLE 2

A light transmitting tube was made in the same manner as Example 2 except for using soft fluororubber having hardness of 60° as the cladding material. The light retention was measured under the same condition as Example 2. The light retention as a result of the measurement was 85%. No air layer appeared at the bent portion.

As apparent from the aforementioned examples and comparative examples, according to the first aspect of the present invention, the light transmitting tube with significantly reduced optical loss at a bent portion can be provided.

An embodiment of a light transmitting tube according to a second aspect has the same sectional views as FIGS. 1, 2 and the same view for explaining the paths of light within the core.

A light transmitting tube 1 of the second aspect comprises a core 2 and a tubular cladding 3 covering the core 2. The material (core material) for the core 2 is a transparent material, of course, having reflection index higher than that of the material (cladding material) for the tubular cladding 3. The core material used in this aspect is preferably thermosetting material.

Concrete examples of the core material include transparent materials including polyallylate, diallyl phthalate, PS (polystyrene), silicone rubber, PMMA and other acrylic resins and rubbers.

The cladding material can be selected from a group of thermoelastic transparent materials having low reflection index. The cladding material preferably has rigidity higher than the core material. Concrete examples as the cladding material include polyethylene, polypropylene, polymethyl methacrylate, polymethyl methacrylate fluoride, polyvinyl chloride, polyvinylidene chloride, polyvinyl acetate, polyethylene-vinyl acetate copolymer, polyvinyl alcohol, polyethylene-polyvinyl alcohol copolymer, fluoroplastic, natural rubber, polyisoprene rubber, polybutadiene rubber, styrene-butadiene copolymer, butyl rubber, halogenated butyl rubber, chloroprene rubber, acrylic rubber, ethylene-propylene-diene terpolymer (EPDM, acrylonitrile-butadiene copolymer, and fluoro rubber.

Among the aforementioned examples of the core material and the cladding material, PS and PMMA are preferable for the core material because of their optical characteristics, including transparency and reflection index, and their workability for simultaneous extrusion. Fluoroplastic is preferable for the cladding material.

The diameter of the core 2 is normally in a range between 2 mm and 30 mm, particularly, in a range between 5 mm and 15 mm, but not limited thereto. The thickness of the tubular cladding 3 is normally in a range between 0.05 mm and 4 mm, particularly, in a range between 0.2 mm and 2 mm.

In the second aspect, heat treatment is provided at a part of the light transmitting tube in such a manner as to produce a space (air layer) 4 between the outer surface of the core 2 and the inner surface of the cladding 3 as shown in FIG. 2. The heat treatment is conducted under a condition where the tube is heated at 60–80° for 30–120 minutes. Instead of this high-temperature treatment by heating the tube, a low-temperature treatment by cooling the tube can be employed. In this case, the space (air layer) is produced by keeping the tube at a temperature from −20° C. to −40° C. for 1 hour to 10 hours, particularly for 3 hours to 6 hours.

In the second aspect, the core 2 and the cladding 3 are preferably not bonded to each other. The light transmitting tube is manufactured by, for example, extruding the core material to form the core, covering the core with a cylindrical member made of heat shrinkable rubber or resin diameter of which is slightly larger (for example, by 3–20%, particularly 5–15%, more particularly 6–13%) than that of the core, and then, shrinking the cylindrical member by heat. Used as the rubber or resin may be, for example, fluoro rubber or fluoroplastic.

When the air layer 4 is produced at the bent portion as shown in FIG. 2, the difference in the reflection index between the core 2 and the air layer 4 is larger than the difference in the reflection index between the core 2 and the cladding 3 because the reflection index of air is smaller than that of the cladding 3. As a result of this, the critical angle of incident beam (the angle of incidence at which the light can be entirely reflected) relative to the outer surface of the core adjacent to the air layer 4 should be small so that the optical loss, i.e. beams passing through the outer surface of the core, at the bent portion can be reduced. This prevents exorbitant optical loss at the bent portion (particularly, at the outer side of the curvature).

In the second aspect, the air layer may be produced at the portion than the bent portion or across the length of the light transmitting tube.

Since, according to the second aspect, the critical angle of incident beam relative to the outer surface of the core can be increased, the optical loss can be equal to or less than that in case without air layer even when the inclined angle of incident beam is increased.

The second aspect will be described concretely by using examples and comparative examples.

EXAMPLE 3

A light transmitting tube was made by thermal polymerization, in which the core material was soft acrylic resin and the cladding material was high-rigid fluoroplastic. The diameter of the core was 13 mm. The thickness of the cladding was 1 mm. The outer surface of the core and the inner surface of the cladding were not bonded to each other.

The part of the light transmitting tube of 50 cm in length to be bent was heated at 80° C. for 60 minuets to separate the core and the cladding at this portion to form the air layer. The hardness of the cladding was 90°.

The rate of amount of light (light retention) between the incident beams and the outgoing beams was measured under conditions that the light transmitting tube was bent by 90° to have a radius of curvature R=40 mm and that a metal halide lamp of 35 W was used as the light source. The light retention as a result of the measurement was 98%. An air layer having maximum thickness of 0.5 mm was produced at the bent portion.

COMPARATIVE EXAMPLE 3

A light transmitting tube was made in the same manner as Example 3 except for using acrylic resin as the core and using fluoroplastic having hardness of 90° as the cladding material. The light retention was measured under the same condition that the tube was bent by 90° to have R=40 mm. The light retention as a result of the measurement was 94%. No air layer was produced at the portion where the heat treatment was conducted.

As apparent from the aforementioned examples and comparative examples, according to the second aspect, the light transmitting tube with significantly reduced optical loss at a bent portion can be provided. According to the second aspect, the included angle of the incident beams can be increased without increasing the optical loss, thus allowing the employment of a light source having broad angular dispersion.

What is claimed is:

1. A light transmitting tube comprising:
   a tubular cladding and a solid core made of a material having reflection index higher than that of a material for the tubular cladding,
   wherein said cladding has rigidity higher than said core, and said core and said cladding are not bonded to each other so that when a portion of the light transmitting tube is bent, a space for an air layer is formed between an outer surface of the core and an inner surface of the cladding at a bent portion.

2. A light transmitting tube as claimed in claim 1, wherein said cladding consists of a thermoplastic tube and said core is flexible.

3. A light transmitting tube as claimed in claim 2, wherein the core is transparent, and consists of at least one of polystyrene, styrene-methyl methacrylate copolymer, (meth)acrylic resin, polymethyl pentene, allyl glycol carbonate resin, spiran resin, amorphous polyolefin, polycarbonate, polyamide, polyallylate, polysulfone, polyallyl sulfone, polyether sulfone, polyether imide, polyimide, diallyl phthalate, fluoroplastic, polyester carbonate, resin of norbornane family, alicyclic acrylic resin, silicone resin, acrylic rubber, and silicone rubber.

4. A light transmitting tube as claimed in claim 2, wherein the core consists of at least one of polystyrene, polycarbonate, and styrene-(meth)acrylate copolymer.

5. A light transmitting tube as claimed in claim 2, wherein said cladding consists of at least one of polyethylene, polypropylene, polymethyl methacrylate, polymethyl methacrylate fluoride, polyvinyl chloride, polyvinylidene chloride, polyvinyl acetate, polyethylene-vinyl acetate copolymer, polyvinyl alcohol, polyethylene-polyvinyl alcohol copolymer, fluoroplastic, silicone resin, natural rubber, polyisoprene rubber, polybutadiene rubber, styrene-butadiene copolymer, butyl rubber, halogenated butyl rubber, chloroprene rubber, acrylic rubber, ethylene-propylene-diene terpolymer, acrylonitrile-butadiene copolymer, fluororubber, and silicone rubber.

6. A light transmitting tube as claimed in claim 2, wherein said cladding consists of a polymer of (meth)acrylic family.

7. A light transmitting tube comprising a tubular cladding made of thermoplastic material and a solid core made of a material having reflection index higher than that of a material for the tubular cladding, wherein said cladding is expanded by heating, whereby an air layer is produced between said core and said cladding.

8. A light transmitting tube as claimed in claim 7, wherein said core is transparent, and consists of at least one of polyallylate, diallyl phthalate, polystyrene, silicone resin, PMMA, and other acrylic resins and rubbers.

9. A light transmitting tube as claimed in claim 7, wherein said core is made of thermosetting material.

10. A light transmitting tube as claimed in claim 9, wherein said cladding consists of a fluoroplastic.

11. A light transmitting tube as claimed in claim 9, wherein said core consists of at least one of polystyrene and PMMA.

12. A light transmitting tube as claimed in claim 9, wherein said cladding consists of at least one of polyethylene, polypropylene, polymethyl methacrylate, polymethyl methacrylate fluoride, polyvinyl chloride, polyvinylidene chloride, polyvinyl acetate, polyethylene-vinyl acetate copolymer, polyvinyl alcohol, polyethylene-polyvinyl alcohol copolymer, fluoroplastic, natural rubber, polyisoprene rubber, polybutadiene rubber, styrene-butadiene copolymer, butyl rubber, halogenated butyl rubber, chloroprene rubber, acrylic rubber, ethylene-propylene-diene terpolymer, acrylonitrile-butadiene copolymer, and fluororubber.

13. A light transmitting tube as claimed in claim 7, wherein a part of the light transmitting tube is partially heated, an air layer is produced between the outer surface of said core and the inner surface of said cladding at said part.

14. A light transmitting tube as claimed in claim 13, wherein the light transmitting tube is heated at 60–80° for 30–120 minutes.

* * * * *